United States Patent [19]
McCandlish et al.

[11] Patent Number: 5,776,264
[45] Date of Patent: Jul. 7, 1998

[54] METHOD FOR PRODUCING AMORPHOUS BASED METALS

[75] Inventors: Larry E. McCandlish, Highland Park; Bernard Kear, Whitehouse Station, both of N.J.; Nicos C. Angastiniotis, Nicosia, Cyprus

[73] Assignee: Rutgers University, Piscataway, N.J.

[21] Appl. No.: 631,453

[22] Filed: Apr. 12, 1996

[51] Int. Cl.$^6$ .................................................... C22B 34/30
[52] U.S. Cl. ........................ 148/237; 148/238; 148/281; 148/284; 148/561; 75/363; 75/369; 423/53; 423/61
[58] Field of Search ........................ 148/237, 238, 148/281, 284, 561; 75/351, 363, 367, 369, 623; 423/53, 61

[56] References Cited

U.S. PATENT DOCUMENTS

| | | | |
|---|---|---|---|
| 4,115,526 | 9/1978 | Auborn et al. | 75/623 |
| 5,330,557 | 7/1994 | May | 75/623 |
| 5,580,397 | 12/1996 | Meyer et al. | 148/238 |

FOREIGN PATENT DOCUMENTS

| | | | |
|---|---|---|---|
| 3837782 | 5/1990 | Germany | 148/284 |

OTHER PUBLICATIONS

*Formation and Alloying of Nanostructured B–W Powders*, N.C. Angastiniotis, B. H. Kear, L.E. McCandlish, K.V. Ramanujachary, M. Greenblatt, Nanostruct. Mat., 1, 293 (1992).

*Chemical Processing and Properties of Nanostructured W–Base Materials*, B.H. Kear, L.E. McCandlish, SAMPE Quarterly, (1993).

*Primary Examiner*—George Wyszomierski
*Attorney, Agent, or Firm*—Wood, Herron & Evans, L.L.P.

[57] ABSTRACT

Amorphous tungsten, cobalt, nickel, molybdenum, iron and alloys thereof can be formed by reducing metal-containing compositions to form the elemental metal wherein the particle size of the elemental metal is less than about 80 microns. This is oxidized in an oxygen-starved environment containing less than 3% oxygen and an inert gas to slowly oxidize the elemental metal. By oxidizing the metal under these conditions, the normal exotherm occurring during oxidation is avoided. The slow oxidation of the metal continues forming an amorphous metal oxide. The amorphous metal oxide can then be reacted in a reducing environment such as hydrogen to form the amorphous elemental metal. This amorphous elemental metal can then be reacted with a carburizing gas to form the carbide or ammonia gas to form the nitride or hexamethylsilane to form the silicide. This permits gas/solid reactions. The amorphous metal can also be used in a variety of different applications.

8 Claims, 3 Drawing Sheets

METHOD FOR PRODUCING AMORPHOUS BASED METALS

GOVERNMENT INTEREST

Work leading to this invention was funded in part through ONR Control #N00014-91-J-1818. Accordingly, the United States government may own certain rights in this invention.

BACKGROUND OF THE INVENTION

The present invention relates to the formation of amorphous metal powders and, in addition, relates to a method of producing amorphous tungsten, molybdenum and molybdenum alloys and their alloys with chromium, iron, cobalt and nickel and, further, to the use of these powders to form refractory metal compounds of nanocrystalline grain size.

Elemental metals, as well as compounds formed from metals, exist in a variety of different crystalline states. These elements and compositions can exist in a totally crystalline state which, of course, can take on several different forms, and further the crystalline form can often be varied. These different crystalline forms, as well as the degree of crystallinity of metal-containing compositions, effect the reactivity of the composition.

Generally, metal-containing compositions can be reduced to form the elemental metal by heating the composition in the presence of a reducing environment such as hydrogen. The formed elemental metal will generally be crystalline. The elemental metal can also be reoxidized. The oxidation is generally exothermic. Under elevated temperatures in the presence of oxygen, the oxidation reaction is spontaneous. Again, the formed oxide will be, in general, crystalline. This oxidation/reduction can be repeated and the crystallinity remains the same under the same condition.

Low surface area can significantly interfere with reactivity of a powder. Crystalline powders comprising large crystalline grains have low surface area hiding interior atoms from reactive chemicals. High surface area nanocrystalline metal powders, on the other hand, are very reactive. They often oxidize at room temperature on contact with air.

Numerous studies of oxidation/reduction have been conducted on many different metals. Tungsten and molybdenum, in particular, has been studied extensively.

For several decades numerous attempts have been made to produce tungsten powder by reduction using sodium, magnesium, calcium, aluminum, silicon and zinc. For example, Oage has successfully reduced tungsten trioxide ($WO_3$) with zinc and hydrogen at about 800° C. After synthesis, the zinc oxide is leached out with hydrochloric acid.

Today on an industrial scale, tungsten powder is prepared by hydrogen reduction of tungsten trioxide. Final particle size is determined by controlling the reduction temperature and moisture content of the reducing gas. The yellow oxide powder is loaded in boats and the reduction carried out in push furnaces using a high rate of hydrogen flow to remove the water. Numerous publications exist that describe the mechanism of reduction of tungsten trioxide in hydrogen in the formation of other tungsten oxygen compounds. The most definitive studies on reduction of tungsten oxides to metals have been performed by Haubner, et al.

SUMMARY OF THE INVENTION

The present invention is premised on the realization that amorphous metals can be formed from metal oxides by reducing the metal compound in a hydrogen atmosphere at elevated temperature. Slow, low-temperature, controlled reoxidation of the metal compound promotes a decrease in oxide grain size, i.e., if the reoxidation is properly controlled so that the exotherm from the oxidation reaction is prevented. This works with easily-oxidized metals such as tungsten and molybdenum. This works with both the alpha tungsten and beta tungsten forms.

Further, these amorphous metals and alloys of these metals can then be reacted with gas compositions at low temperature to form refractory metal compounds such as nitrides, carbides and silicides.

The objects and advantages of the present invention will be further appreciated in light of the following detailed description.

DETAILED DESCRIPTION

Figure 1:
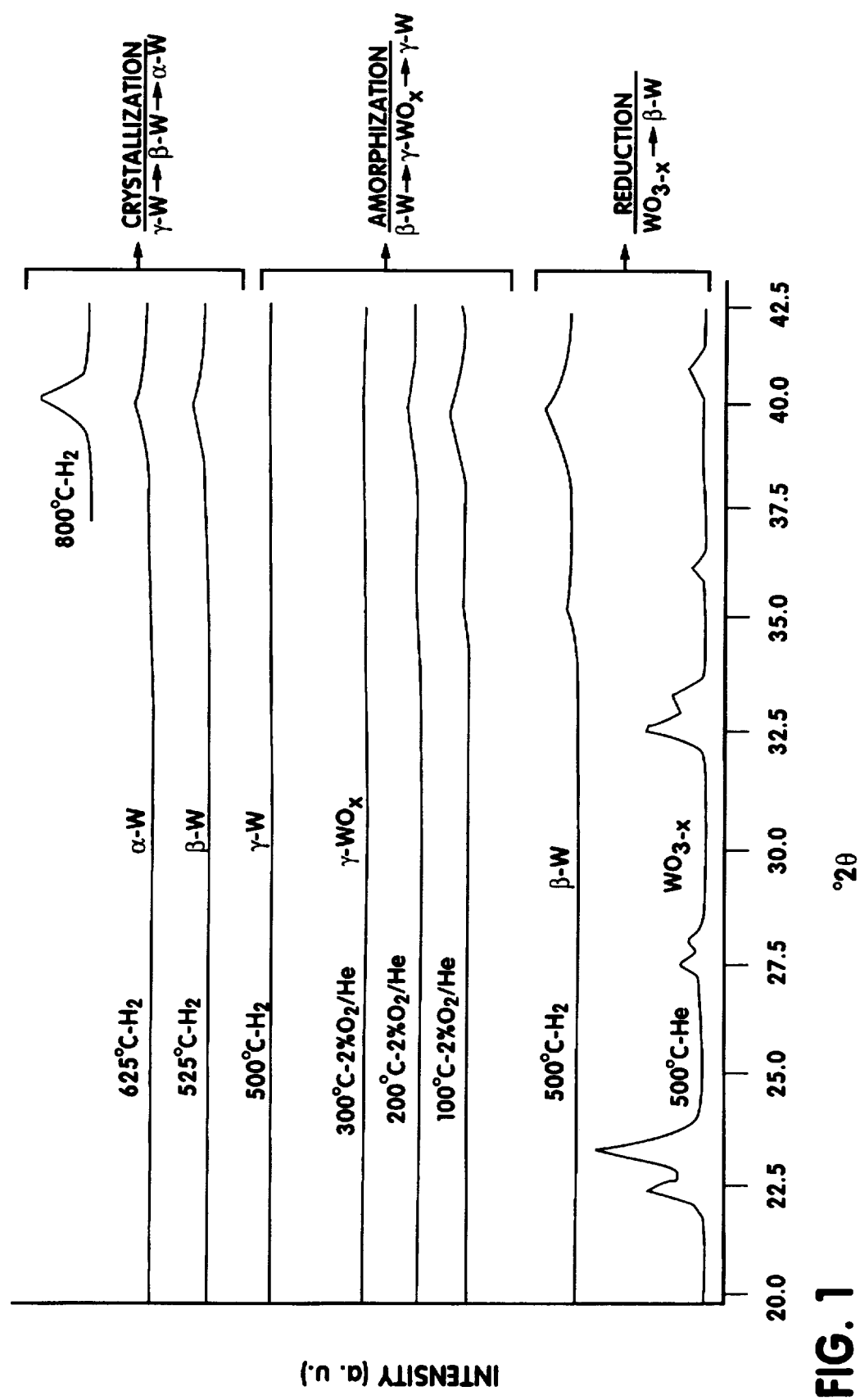
FIG. 1 shows the x-ray diffraction patterns of the products of the sequential reactions described in Example 2.

The present invention is a method of forming amorphous metals, specifically tungsten and molybdenum and their alloys with chromium, iron, cobalt, and nickel. The starting materials useful for formation of these amorphous metals can be any chemical composition that includes these metals, although oxides and oxygen-containing salts are preferred.

Specific tungsten compositions include elemental tungsten, tungsten oxides and ammonia metatungstate. Basically, any tungsten compound which does not contain atoms which can be driven off such as other unwanted metals can be used. Compositions which contain only tungsten and oxygen, nitrogen, carbon or hydrogen are quite suitable. If an alloy is desired, a mixture of the tungsten compound and a similar composite formed from a second metal serve as the starting material.

Specific molybdenum compositions include elemental molybdenum, molybdenum oxides and ammonium molybdate, which is water soluble.

Preferably, the particle size of the starting material will be from about 80 to about 5 microns in size or less. The particle size can be established by, for example, grinding the composition or more easily can be formed by forming a solution of the chemical composition and spray drying this. This method permits not only single composition particles to be formed, but also particles formed from two or more compositions so that ultimately an amorphous alloy is formed.

The solution can be of any dilution up to saturation of the individual components. The solvent can be water or an organic solvent. The particular solvent or chemical composition is not particularly important, although water is preferred for environmental reasons. The solution itself should be formed with the starting materials in a ratio equal to the desired ratio of the metals of the desired end product. Thus, if an alloy having equal amounts of iron and cobalt is desired, the starting solution should have equal amounts of tungsten and molybdenum.

As described, these are preferably spray dried to form amorphous particles having a particle size of about 80 to about 5 microns.

The particles are then reduced in a hydrogen environment at a temperature below the melting point of the composition. This can vary from about 500° C. up to about 1,000° C.

The reduction is conducted in a reducing environment and preferably is conducted in a hydrogen-containing atmosphere. This is continued until substantially complete reduction occurs. This will form the metal composition.

In order to form the amorphous metal composition, the reduced metal particles are then subjected to a controlled reoxidation. With each of these metals, the uncontrolled oxidation will produce an exotherm, creating a rapid reaction, driving all the composition to the oxide form almost instantaneously. However, by controlling the oxidizing environment, the exotherm can be avoided. This is controlled by maintaining the temperature at about 300° C. to 350° C. and controlling the oxygen content of the environment at about 0.5% to about 3% oxygen, preferably 1% to 2%, with the remainder of the environment being an inert gas such as argon or nitrogen.

Over a period of about several hours, the reaction will go to completion, forming the oxide. The oxide is amorphous in form, which means when subjected to X-ray crystallography it fails to produce any characteristic crystalline peak. The elemental amorphous metal can then be formed by reducing the amorphous oxide at elevated temperature in a hydrogen atmosphere. This will, in turn, form elemental amorphous metal or metal alloys which will generally have a particle size varying from about 50 nanometers down to less than or equal to 100 angstroms in size. If the metal is not completely amorphous, the oxidation and reduction can be repeated and the crystallinity will be reduced or eliminated.

The initial reduction of tungsten can form the β-tungsten species. The β-tungsten can also be reacted with ammonia (instead of oxygen) to form amorphous tungsten nitride. The β-tungsten can also be reacted with carbon monoxide to form amorphous tungsten oxycarbide. Again, with these reactions it is important to control the temperature and concentration of reactant gas ($NH_3$ or CO) to avoid a rapid or strong exothermic reaction. As with the oxidation reaction, the nitridation or carburization reaction must be conducted at less than about 350° C.

As previously indicated, this reaction can be conducted with tungsten, molybdenum, alloys of tungsten and molybdenum, as well as iron, chromium, cobalt and nickel alloys of tungsten or molybdenum.

Once formed, the elemental amorphous metal can be further reacted to form refractory metal compositions. The individual metal composition or alloys can be reacted in the presence of ammonia to form the nitride composition. The elemental amorphous metal can also be reacted with a carburizing gas, such as a carbon dioxide-carbon monoxide mixture, to form the metal carbide. These can also be reacted with hexamethyldisilazane to form the silicide.

The carburization reaction to form the carbide of the individual compositions can be conducted in a fixed bed or fluidized bed reactor in a controlled environment with a carburizing gas such as carbon monoxide, carbon dioxide, methane or ethane. Generally, the reaction mixture will have sufficient carburizing gas in an inert environment to establish a carbon activity of about 1. This is passed through the amorphous metal.

The reaction is conducted at a temperature of about 550° C. to about 700° C. over a period of 20 to 240 minutes. The formed carbide should have a particle size of less than 20 nanometers, preferably less than 10 nanometers.

The present invention will be further appreciated in light of the following detailed examples.

EXAMPLE 1

Preparation of amorphous tungsten via α-tungsten

Ammonium metatungstate (AMT) was pyrolyzed by heating in flowing helium to 500° C. to product $WO_{3-x}$, a mixture of $WO_3$ and $WO_{2.9}$. The $WO_{3-x}$ was reduced in hydrogen at 625° C., reoxidized in a 2% mixture of oxygen in helium, and finally re-reduced in hydrogen to produce high surface area α-tungsten, α-W. The high surface area α-W was cooled to 25° C. in flowing helium gas and then heated in a series of steps to 300° C. in flowing 2% $O_2$/He to produce amorphouse tungsten oxide, γ-$WO_x$.

| Temperature (°C.) | Time (minutes) |
|---|---|
| 25 | 300 |
| 100 | 200 |
| 200 | 200 |
| 250 | 600 |
| 300 | 1800 |

The γ-$WO_x$ was heated i flowing hydrogen to 400° C. upon which it reduced to amorphous tungsten, γ-W.

EXAMPLE 2

Preparation of amorphous tungsten via β-tungsten

Ammonium metatungstate (AMT) was pyrolyzed by heating in flowing helium to 500° C. to produce $WO_{3-x}$, a mixture of $WO_3$ and $WO_{2.9}$. The $WO_{3-x}$ was reduced in hydrogen at 500° C., reoxided in a 2% mixture of oxygen in helium, and finally re-reduced in hydrogen to produce high surface area β-tungsten, β-W. The high surface area β-W was cooled to 25° C. in flowing helium gas and then heated in a series of steps to 300° C. in flowing 2% $O_2$/He to produce amorphous tungsten oxide, γ-$WO_x$.

| Temperature (°C.) | Time (minutes) |
|---|---|
| 25 | 90 |
| 100 | 200 |
| 200 | 200 |
| 250 | 200 |
| 300 | 170 |

The γ-$WO_x$ was heated in flowing hydrogen to 400° C. upon which it reduced to amorphous tungsten, γ-W. This is further depicted in FIG. 1.

EXAMPLE 3

Preparation of amorphous tungsten nitride via β-tungsten

β-W is heated in a series of steps to 300° C. in flowing ammonia gas to produce amorphous tungsten nitride, γ-$WN_x$ or δ-$WN_x$.

| Temperature (°C.) | Time (minutes) |
|---|---|
| γ-$WN_x$ | |
| 25 | 90 |
| 100 | 300 |
| 200–300 | 400 |
| δ-$WN_x$ | |
| 25 | 90 |
| 100–300 | 400 |

Figure 2:
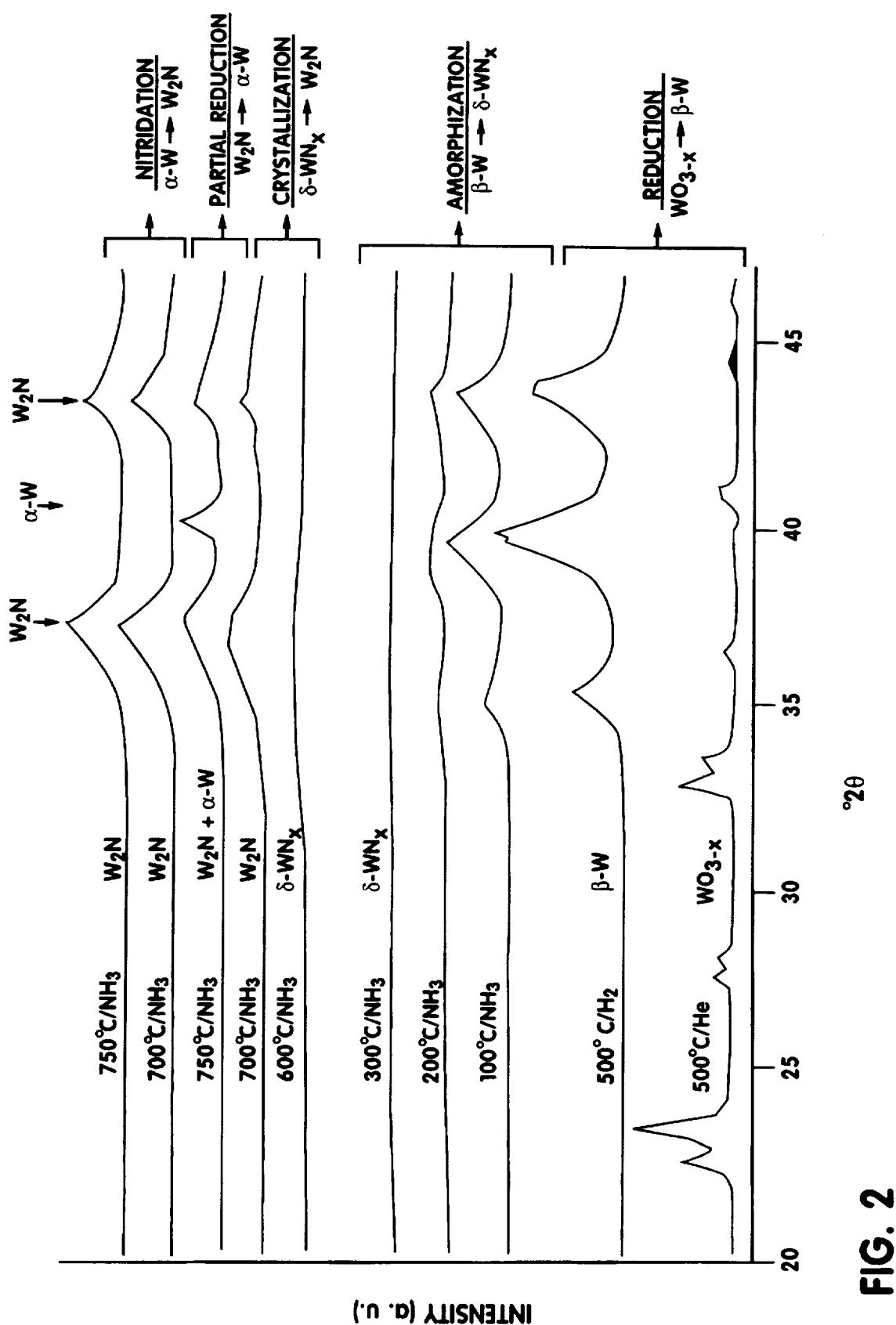
FIG. 2 shows the x-ray diffraction patterns of the products of the reactions described in Example 3.

This is further depicted in FIG. 2.

EXAMPLE 4

Preparation of amorphous tungsten oxycarbide via β-tungsten

β-W is heated in a series of steps to 300° C. in flowing ammonia gas to produce amorphous tungsten nitride, δ $WC_xO_y$.

| Temperature (°C.) | Time (minutes) |
|---|---|
| 25 | 100 |
| 100 | 200 |
| 200–300 | 400 |

Figure 3:
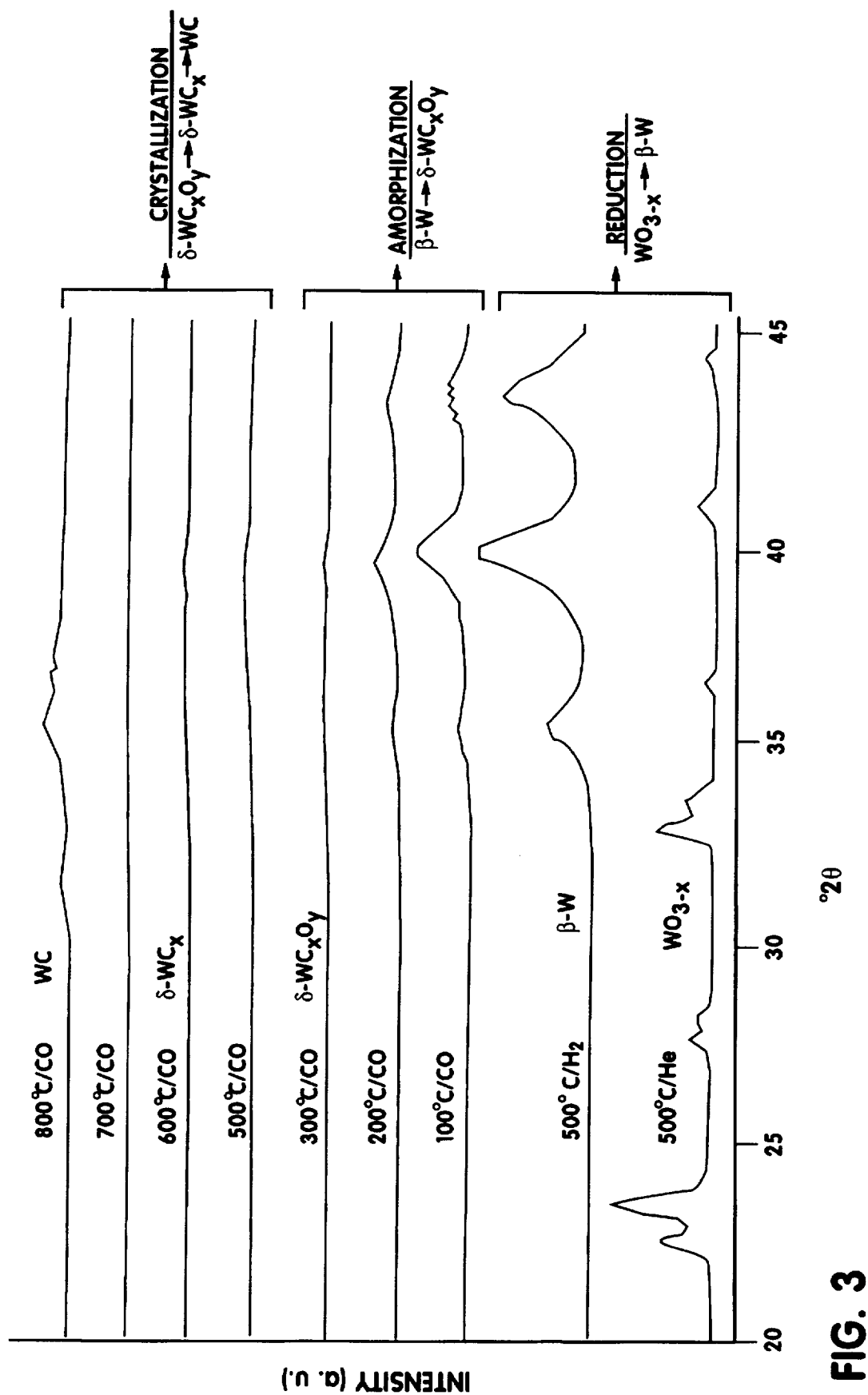
FIG. 3 shows the x-ray diffraction patterns of the products of the reactions described in Example 4.

This further depicted in FIG. 3.

In addition to being useful for formation of silicides, carbides and nitrides and other refractory composition, the present invention is also useful in the elemental form to provide amorphous powder coatings and the like. They can also be blended with compositions for alloying and used in any application in which elemental metal is employed. The amorphous metal oxide can also be used in any reaction calling for such an oxide. The decreased particle size should facilitate mixing and improve reactivity. The particle size of the oxides makes these oxides useful as pigments and coatings and in ceramics.

The preceding has been a description of the present invention in such terms that will allow those skilled in the art to practice this invention. Further, the best mode of practicing this invention is also disclosed herein.

However, the invention itself should only be defined by the appended claims wherein we claim:

1. A method of forming an amorphous metal compound of a metal selected from the group consisting of tungsten, molybdenum, tungsten-molybdenum alloys, alloys containing tungsten or molybdenum and a metal selected from the group consisting of chromium, iron, cobalt and nickel comprising;

reducing a composition containing said metal to form metal; and oxidizing said metal at a temperature less than about 350° C. in an environment comprising less than about 3% oxygen in an inert gas, thereby oxidizing said elemental metal without generating an exotherm, and forming amorphous metal oxide.

2. The method claimed in claim 1 further comprising reducing said amorphous metal oxide to form amorphous metal.

3. The method claimed in claim 2 wherein said composition containing said metal is a solid compound having a particle size of less than 80 microns.

4. The method claimed in claim 2 wherein said metal is tungsten.

5. The method claimed in claim 2 wherein said metal comprises a mixture of tungsten and molybdenum.

6. A method of forming amorphous metal, said metal selected from the group consisting of tungsten, cobalt, nickel, molybdenum, iron and mixtures thereof comprising:

oxidizing elemental metal in an environment comprising less than about 3% oxygen in an inert gas at a temperature of less than 350° C. wherein said elemental metal has a particle size of less than 80 microns thereby oxidizing said elemental metal without generating an exotherm and forming amorphous metal oxide; and reducing said amorphous metal oxide to form amorphous elemental metal.

7. A method of forming amorphous metal nitride of a metal selected from the group consisting of tungsten and molybdenum comprising reducing a composition containing said metal to form elemental metal;

reacting said elemental metal in an environment comprising less than about 3% ammonia in an inert gas at a temperature less than 350° C., thereby forming amorphous metal nitride without generating an exotherm.

8. A method of forming an amorphous metal carbide compound of a metal selected from the group consisting of tungsten and molybdenum comprising reducing a composition containing said metal to form elemental metal;

carburizing said elemental metal in an environment comprising less than about 3% carburizing gas in an inert gas at a temperature less than 350° C., thereby forming amorphous metal carbide without generating an exotherm.

* * * * *